United States Patent [19]

Sugimoto et al.

[11] Patent Number: 5,583,752
[45] Date of Patent: Dec. 10, 1996

[54] SWITCHING POWER SUPPLY FOR GENERATING A VOLTAGE IN ACCORDANCE WITH AN INSTRUCTION SIGNAL

[75] Inventors: Hidehiko Sugimoto, Aichi; Yasuyuki Morishima, Kyoto, both of Japan

[73] Assignee: Murata Manufacturing Co., Ltd., Japan

[21] Appl. No.: 280,790

[22] Filed: Jul. 26, 1994

[30] Foreign Application Priority Data

Jul. 29, 1993 [JP] Japan ................................ 5-187901

[51] Int. Cl.⁶ .......................................... H02M 3/335
[52] U.S. Cl. .......................... 363/21; 363/47; 363/97
[58] Field of Search ........................ 363/21, 47, 95, 363/97, 132

[56] References Cited

U.S. PATENT DOCUMENTS

| | | | |
|---|---|---|---|
| 4,731,720 | 3/1988 | Takahashi | 363/21 |
| 5,208,432 | 5/1993 | Han | 363/21 |
| 5,222,015 | 6/1993 | Nakagawa | 363/21 |

*Primary Examiner*—Peter S. Wong
*Assistant Examiner*—Adolf Berhane
*Attorney, Agent, or Firm*—Ostrolenk, Faber, Gerb & Soffen, LLP

[57] ABSTRACT

A power supply includes a power converter 2 for generating an output voltage to be supplied to a load 3 from a power source 4, a filter 5 connected between power converter 2 and load 3, and a controller 10 for controlling the power converter 2, in which controller 10 applies a voltage instruction value $v_r$ applied as an input to circuitry which implements an operation element A defined as:

$$\frac{b_2 s^2 + b_1 s + b_0}{s(s + a_0)},$$

subtracts the output voltage from instruction voltage $v_r$, and applies the difference to power converter 2.

16 Claims, 11 Drawing Sheets

$$b_1 = \frac{R_1}{R_2} \quad b_0 = \frac{1}{C_1 R_2}$$

$$a_0 = \frac{R_1 + R_2}{C_1 R_1 R_2}$$

SWITCHING POWER SUPPLY FOR GENERATING A VOLTAGE IN ACCORDANCE WITH AN INSTRUCTION SIGNAL

BACKGROUND OF THE INVENTION

1. Field of the Invention

The present invention relates to a power supply. More specifically, the present invention relates to a power supply for generating a voltage in accordance with an instruction signal.

2. Description of the Background Art

A general power supply must be designed such that an output voltage $v_0$ stably and quickly follows an instruction voltage $v_r$.

FIG. 10 is an electric circuit diagram of a switching regulator which is an example of such power supply. Referring to FIG. 10, a controller 1 receives an instruction voltage $v_r$ and an output voltage $v_0$ which is fed back thereto. Controller 1 provides a control signal u, which is a difference between instruction voltage $V_r$ and output voltage $v_0$, to a comparing input of a comparator 21 in a power converter 2. To a reference input of comparator 21, a triangular wave signal is applied from a triangular wave generator 22. Comparator 21 compares the control signal and the triangular wave signal, and applies a pulse signal having a pulse width corresponding to the level of the control signal u to a gate driving circuit 23.

Gate driving circuit 23 provides a driving pulse to the gate of a power MOS field effect transistor 24. Power MOS field effect transistor 24 has its drain connected to a positive pole of a DC power source through a primary coil of a transformer 25, while the source of power MOS field effect transistor 24 and the negative pole of DC power source 4 are grounded. Power MOS field effect transistor 24 turns on/off in accordance with a driving pulse applied to the gate, and provides an elevated (or lowered) pulse voltage to a secondary coil of transformer 25. The pulse voltage is made smooth by a filter 5 including a coil L and a capacitor C through rectifier diodes 26 and 27 to be a DC voltage, which DC voltage is supplied to a load 3.

The switching regulator shown in FIG. 10 can be represented by the block diagram of FIG. 11. Referring to FIG. 11, filter 5 and load 3 of FIG. 10 can be represented by the following equation (1).

$$\frac{\frac{1}{LC}}{s^2 + \frac{1}{CR} s + \frac{1}{LC}} = \frac{1}{\frac{1}{\omega_n^2} s^2 + \frac{2\zeta}{\omega_n} s + 1} \quad (1)$$

$$\text{where } \omega_n^2 = \frac{1}{LC}, \zeta = \frac{1}{2R}\sqrt{\frac{L}{C}}$$

According to the equation (1), when $\zeta<1$, the denominator cannot be factored by a real number. In that case, there are portions where the gain becomes larger but the phase is delayed, as the frequency is increased in the characteristics of filter 5 and load 3, as shown in the bode diagram of FIG. 12.

In order to compensate for the instability caused by the fact that the phase is delayed while the gain is increased, it is necessary to provide a phase compensator so as to have the phase advanced as the gain is decreased.

FIG. 13 is a circuit diagram of a conventional switching regulator having a phase compensator. In the switching regulator shown in FIG. 13, output voltage $v_0$ is fed back to an amplifier 7 through a phase compensating feedback element 6, the difference between the fed back voltage and the instruction voltage $V_r$ is amplified by amplifier 7, and the amplified output is compared with the triangular wave signal from triangular wave generator 22 in comparator 21. Except for this point, it is the same as the circuitry of FIG. 10. Phase compensating feedback element 6 includes a parallel circuit of a resistor R11 and a capacitor C11, and a grounded resistor R12, and the voltage at the node between resistor R12 and the parallel circuit including resistor R11 and capacitor C11 is input to amplifier 7.

Referring to FIG. 13, the transfer function when the output voltage $v_0$ is viewed from the instruction voltage $v_r$ is represented by the following equation (2).

$$\frac{\frac{K_v k}{LC}(s+a_0)}{s^3 + \left(\frac{1}{CR} + a_0\right)s^2 + \left(\frac{1}{LC} + \frac{a_0}{CR} + \frac{b_1 K_v k}{LC}\right)s + \frac{a_0}{LC} + \frac{b_0 K_v k}{LC}} \quad (2)$$

Though the transfer function follows the instruction, voltage this relation is rather complicated.

The block diagram of the switching regulator shown in FIG. 13 is as shown in FIG. 14. Referring to FIG. 14, phase compensating feedback element 6 can be represented by the following equation (3):

$$\frac{b_1 s + b_0}{s + a_0} \quad (3)$$

$$\text{where } b_1 = \frac{R_{11}}{R_{12}}, b_0 = \frac{1}{c_{11} R_{12}}$$

$$a_0 = \frac{R_{11} + R_{12}}{c_{11} R_{11} R_{12}}$$

With the phase compensated feedback element 6 shown in FIG. 13, the phase cannot be advanced without increasing the gain, and therefore stable operation cannot be expected under the condition of $\zeta<1$.

SUMMARY OF THE INVENTION

Therefore, a main object of the present invention is to provide a power supply which can operate stably even if the gain is decreased, as the frequency is increased in the bode diagram.

Another object of the present invention is to provide a power supply in which a transfer function when the output voltage is viewed from the instruction voltage is simplified so as to provide a good transfer function, that is, a power supply which can reliably follow an instruction voltage.

Briefly stated, the power supply in accordance with the present invention includes a power converter for generating voltage from the power supply, to a load a filter connected between the power converter and the load, and a controller for controlling the power converter, in which a transfer function of the controller of the signal u input to the comparator, viewed from the side of the output voltage $v_0$ is provided in the form of $$\frac{b_2 S^2 + b_1 s + b_0}{s(s + a_0)}$$

, and more preferably, the root of the numerator is made a complex number so as to realize the function of lowering the gain while advancing the phase in a certain frequency range, whereby a more stable controller having good response is implemented. Part of the controller is designed such that the transfer function when the output voltage $v_0$ is viewed from the voltage instruction value $v_r$ is $$\frac{e_0}{s^2 + d_1 s + d_0}$$

so as to realize a controller which can reliably follow the instruction voltage.

The foregoing and other objects, features, aspects and advantages of the present invention will become embodiments of more apparent from the following detailed description of the present invention when taken in conjunction with the accompanying drawings.

DESCRIPTION OF THE PREFERRED EMBODIMENTS

The present invention realizes both stability of the power supply and improved ability to follow the instruction voltage. An embodiment mainly related to the former aspect will be described.

Figure 1:
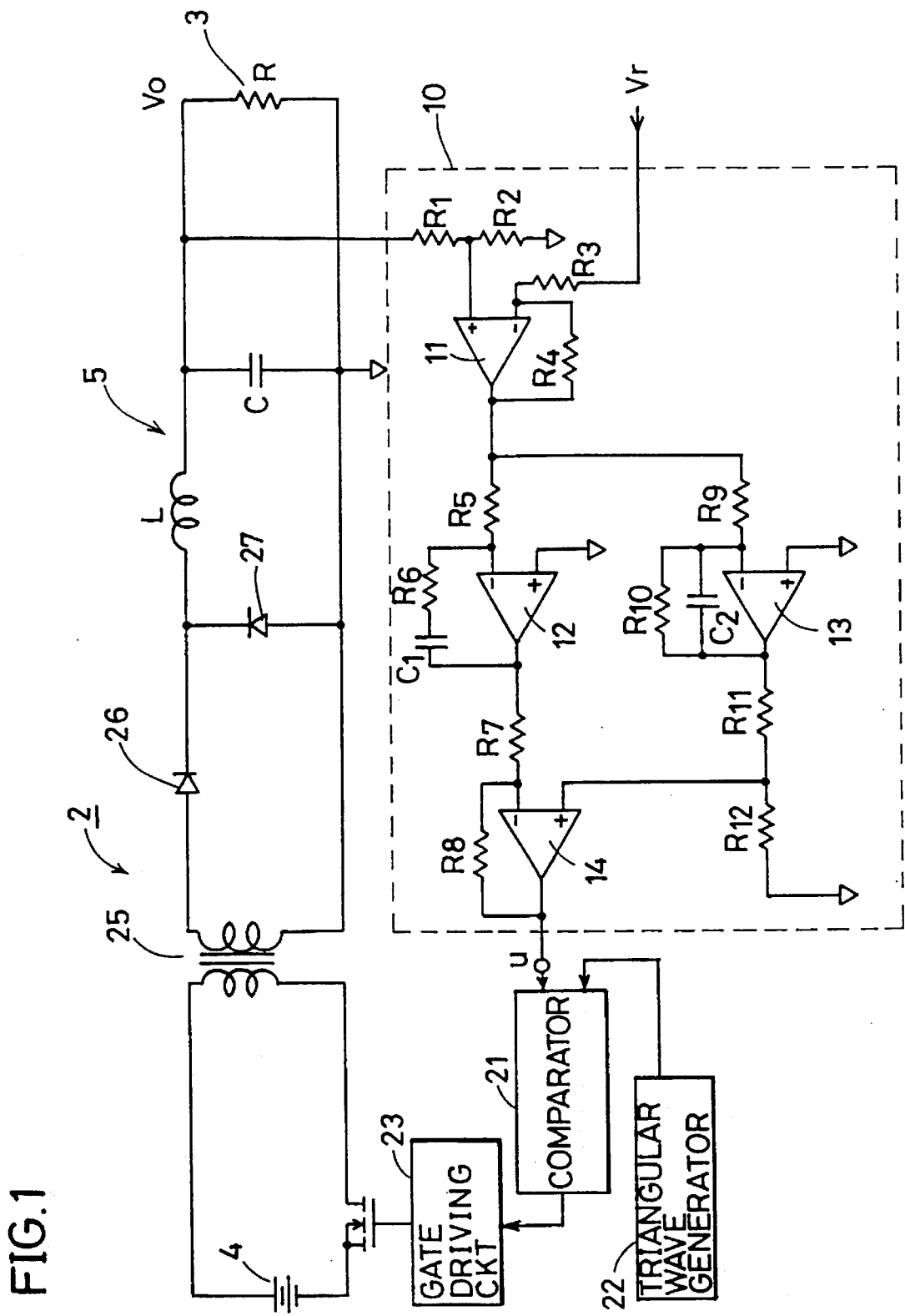
FIG. 1 is a circuit diagram of one embodiment of the present invention.
Figure 10:
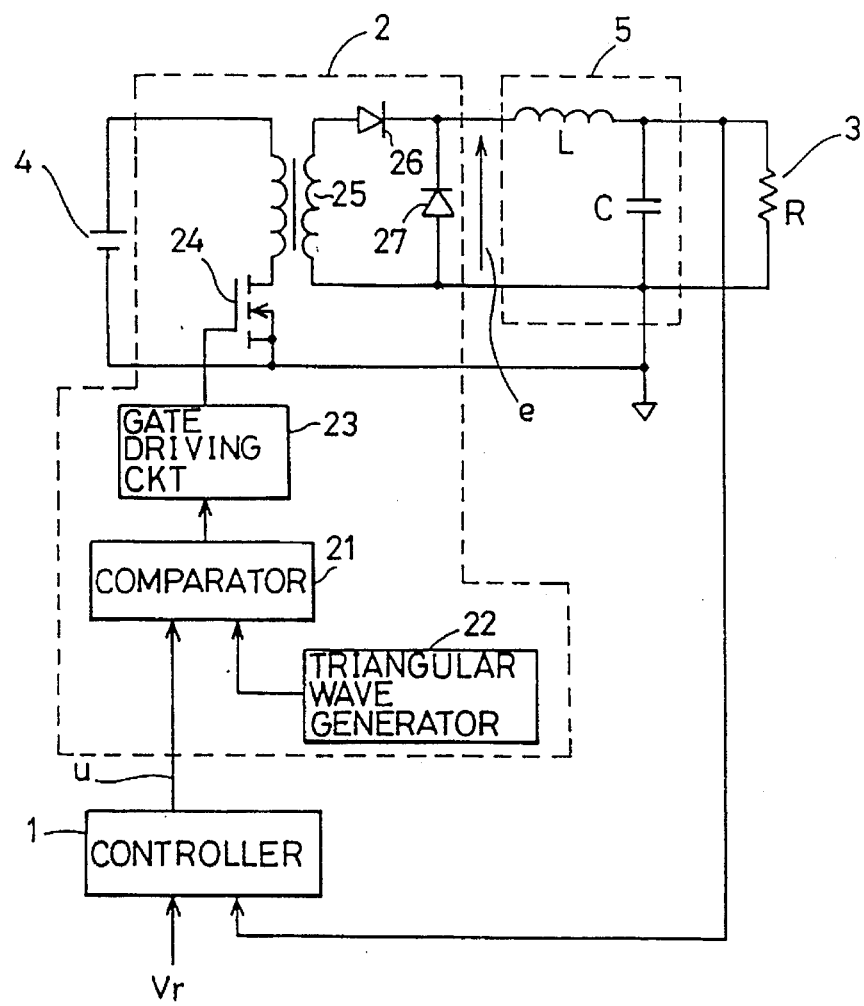
FIG. 10 is a circuit diagram of a conventional power supply.
Figure 11:
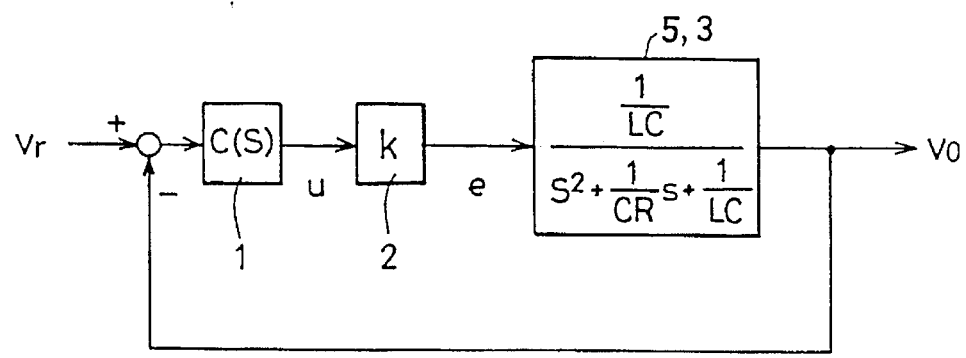
FIG. 11 is a block diagram of the power supply shown in FIG. 10.
Figure 12:
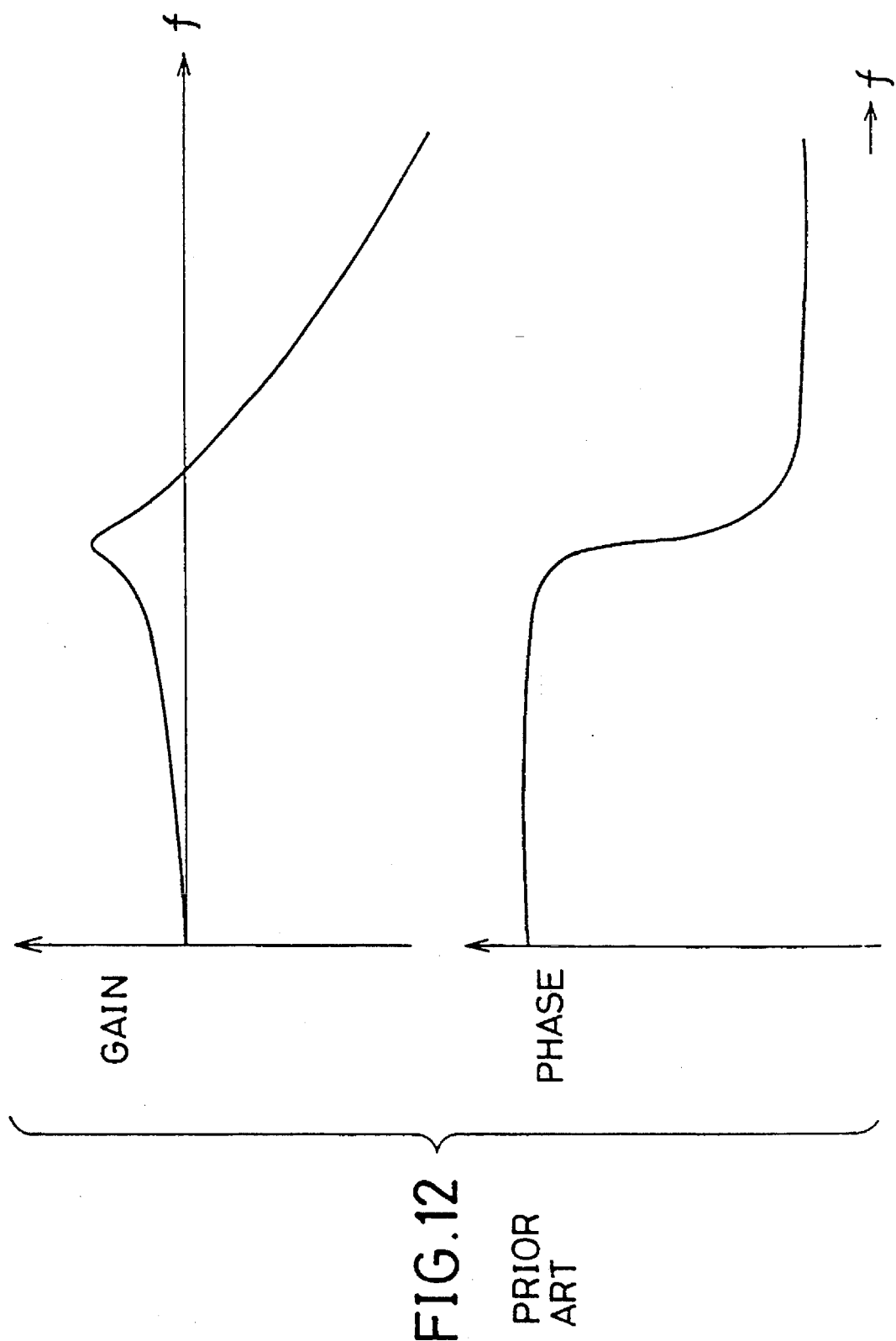
FIG. 12 is a bode diagram of the power supply shown in FIG. 10.
Figure 13:
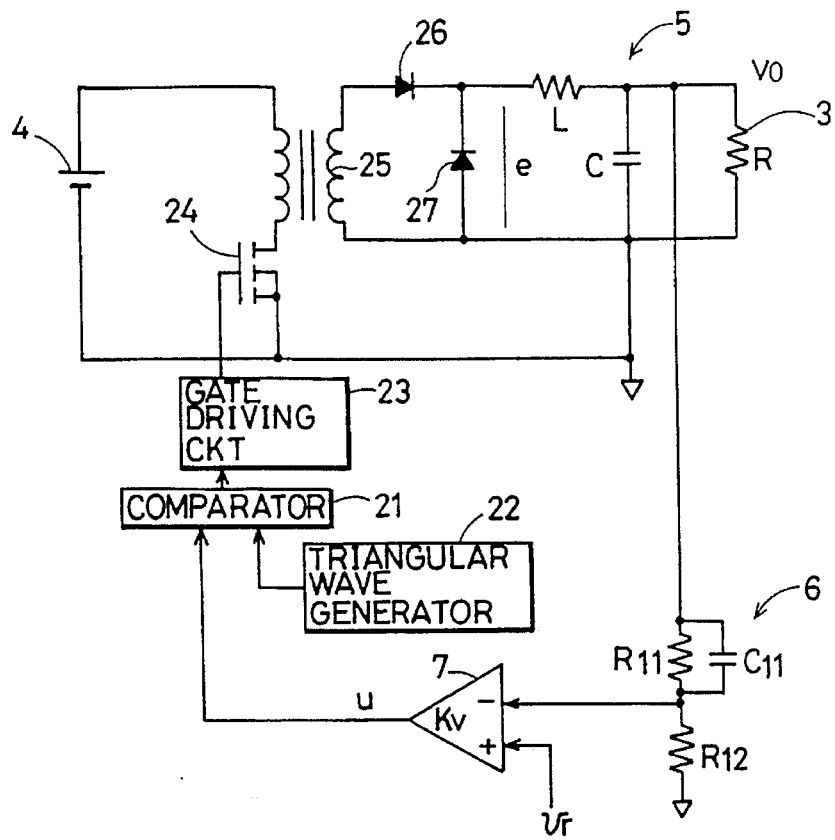
FIG. 13 is an electric circuit diagram showing another example of a conventional power supply.
Figure 14:
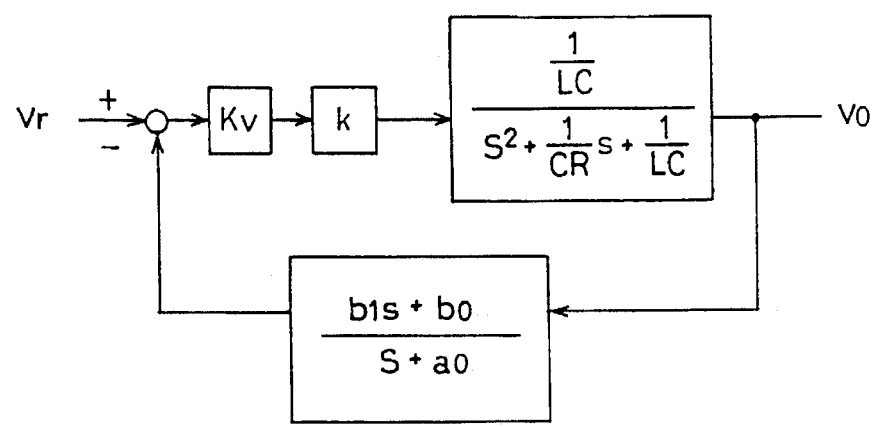
FIG. 14 is a block diagram of the power supply shown in FIG. 13.

FIG. 1 is a circuit diagram of one embodiment of the present invention. Referring to FIG. 10, except for the controller 10, the structure is the same as that of FIG. 10 described above. Controller 10 includes amplifiers 11 to 14, resistors R1 to R12 and capacitors C1 and C2. To one input end of amplifier 11, instruction voltage $v_r$ is applied through resistor R3, and to the other input end of amplifier 11, the output voltage $v_0$ is applied through R1. Between one input end and an output end of amplifier 11, a resistor R4 is connected, and the other input end of amplifier 11 is grounded through resistor R2. An output from amplifier 11 is applied to one input end of amplifier 12 through a resistor R5 and to one input end of amplifier 13 through a resistor R9. The other input end of each of amplifiers 12 and 13 is grounded. Between one input end and an output end of amplifier 12, a series circuit of a resistor R6 and a capacitor C1 is connected, and between one input end and an output end of amplifier 13, a parallel circuit of resistor R10 and capacitor C2 is connected. The output of amplifier 12 is applied to one input end of an amplifier 14 through a resistor R7, and the output end of amplifier 13 is connected to the other input end of amplifier 14 through a resistor R11. Further, the other input end of amplifier 14 is grounded through a resistor R12. Between one input end and an output end of amplifier 14, resistor R8 is connected, and the output of amplifier 14 is connected to a comparing input end of comparator 21.

Assuming that R1=R2=R3=R4=R7=R8=R11=R12 in FIG. 1, values $a_0$, $b_0$, $b_1$ and $b_2$ of the equation (3) above can be respectively represented as:

$$a_0 = \frac{1}{C2R10}, b_1 = \left(\frac{R6}{R5} - \frac{R10}{R9}\right)\frac{1}{C2R10} + \frac{1}{C1R5},$$

$$b_0 = \frac{1}{C1C2R5R10} \quad b_2 = \frac{R6}{R5}$$

Figure 2:
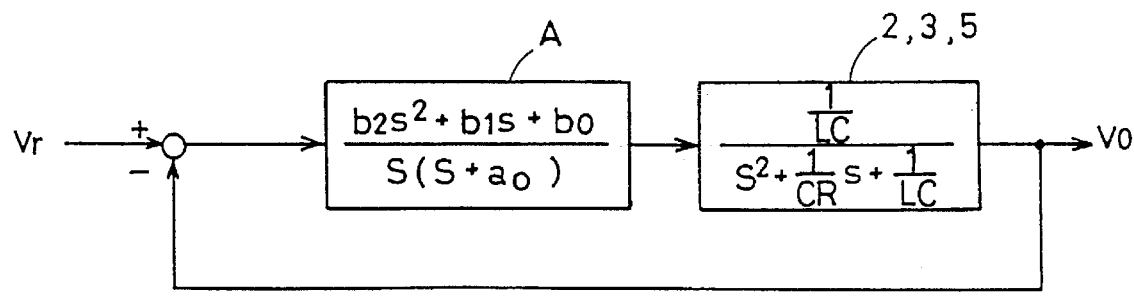
FIG. 2 is a block diagram of the embodiment shown in FIG. 1.
Figure 3:
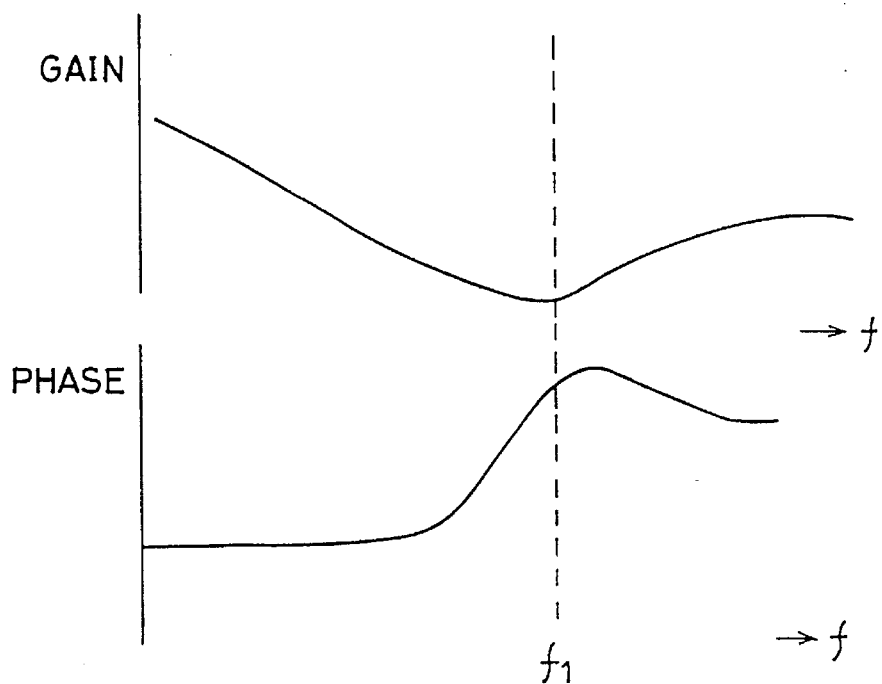
FIG. 3 is a bode diagram of the embodiment shown in FIG. 1.

FIG. 2 is block diagram of the embodiment shown in FIG. 1. Referring to FIG. 2, controller 10 applies the difference obtained by subtracting the output voltage $v_0$ from the instruction voltage $v_r$ to an operation element A which is represented as $$\frac{b_2 S^2 + b_1 s + b_0}{s(s + a_0)} \quad (4)$$

and provides the output to a power converter 2. FIG. 3 is a bode diagram of controller 10 shown in FIG. 10. When controller 10 is structured as shown in FIG. 1 and the transfer function is provided in the form of the equation (4), the function that the gain is decreased while the phase is advanced at a certain frequency $f_1$ can be realized as shown in FIG. 3. As a result, a control system which is more stable and which has good response can be designed. At this time, the transfer function when the output voltage $v_0$ is viewed from the instruction voltage $v_r$ is represented as $$\frac{\frac{1}{LC}(b_2 s + b_1 s + b_0)}{s^4 + \left(\frac{1}{CR} + a_0\right)s^3 + \left(\frac{1}{LC} + \frac{a_0}{CR} + \frac{b_2}{LC}\right)s^2 + \left(\frac{a_0}{LC} + \frac{b_1}{LC}\right)s + \frac{LC}{b_0}}$$

which can be modified as follows:

$$\frac{\frac{1}{LC}(b_2 s_2 + b_1 s + b_0)}{(s^2 + d_1 s + d_0)(s^2 + c_1 s + c_0)}$$

where values $d_1$, $d_0$, $c_1$ and $c_0$ can be arbitrarily adjusted by $a_0$, $b_0$, $b_1$ and $b_2$, and therefore pole arrangement can be freely selected, and a control system which is stable and having good response can be implemented.

Figure 4:
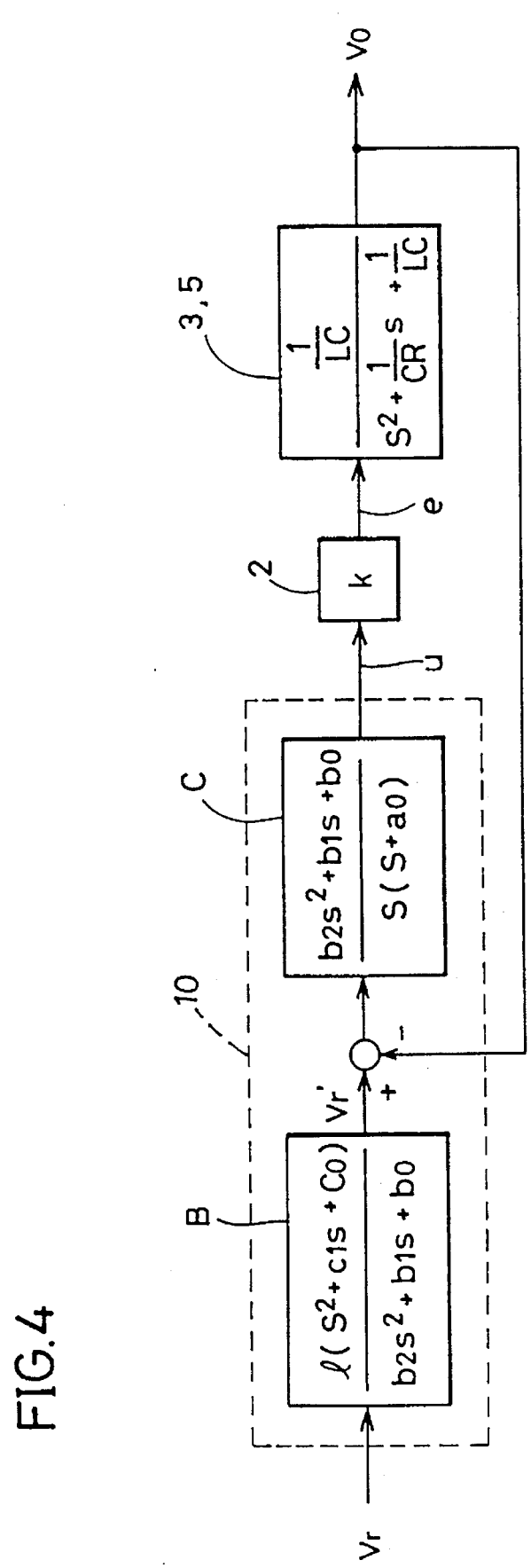
FIG. 4 is a block diagram of another embodiment of the present invention.

Another embodiment related to stability of power supply and improved ability of following the instruction, voltage mainly focused on improvement in the ability of following the instruction voltage will be described. For convenience, description is given first referring to the block diagram. FIG. 4 is the block diagram of the embodiment.

Referring to FIG. 4, by defining a preceding compensating element B as $$\frac{l(s^2 + c_1 s + c_0)}{b_2 s^2 + b_1 s + b_0}$$

the transfer function when the output voltage $v_0$ is viewed from the instruction voltage $v_r$ can be simplified to $$\frac{\frac{l}{LC}}{s^2 + d_1 s + d_0}.$$

Accordingly, the power supply can be designed to have improved ability to follow the instruction, voltage without losing superior stability.

Figure 5:
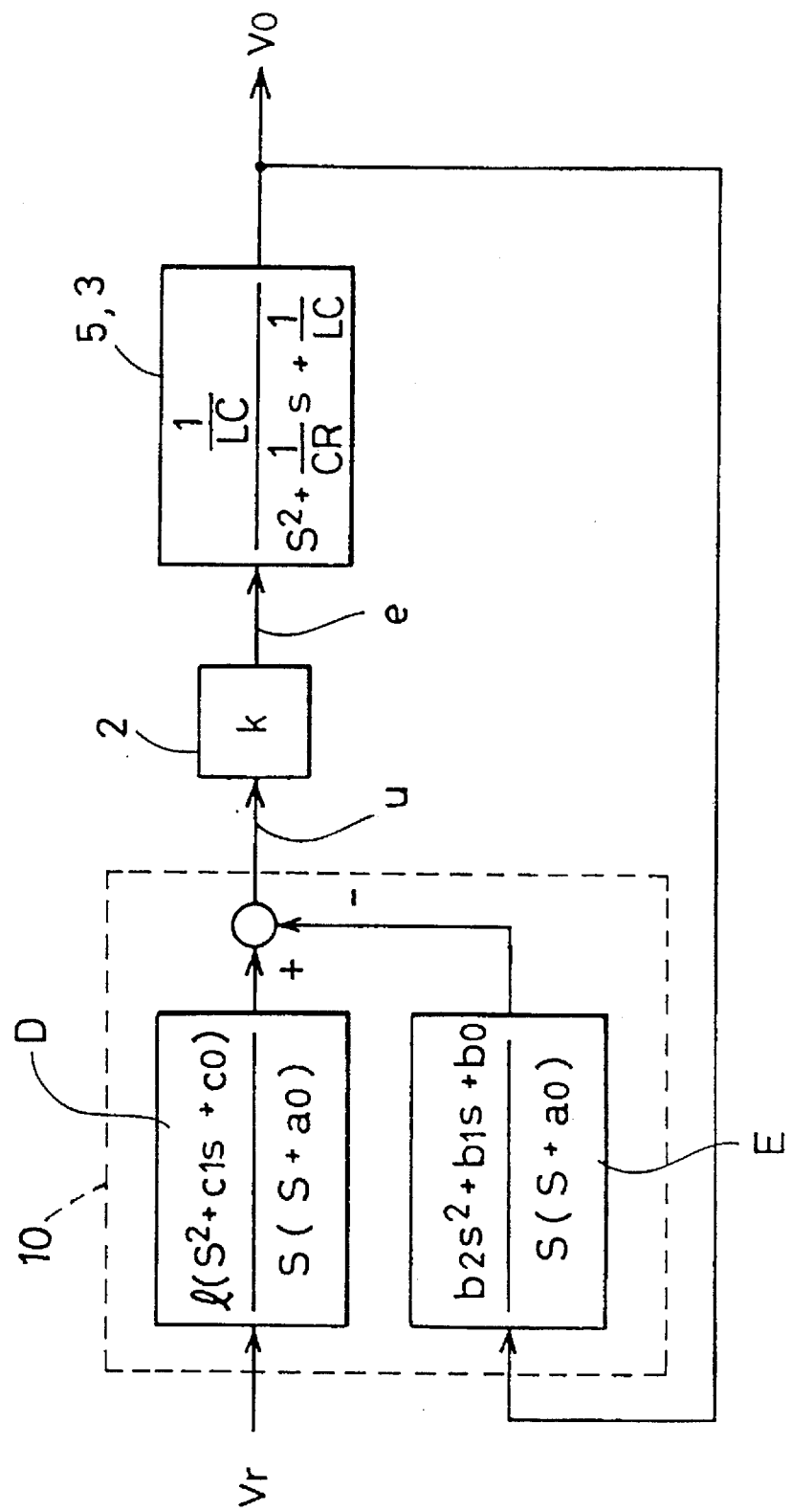
FIG. 5 is a block diagram of still another embodiment of the present invention.

FIGS. 5 to 8 are block diagrams showing still further embodiments of the present invention. Referring to FIG. 5, controller 10 provides the instruction voltage $v_r$ to an operation element D represented by the following equation (5):

$$\frac{l(s^2 + c_1 s + c_0)}{s(s + a_0)} \quad (5)$$

Further, the operation element E represented by the equation (6) recieves the output voltage $v_0$:

$$\frac{b_2 s^2 + b_1 s + b_0}{s(s + a_0)} \quad (6)$$

The output of operation element E is subtracted from the output of operation element D, and the result is applied to power converter 2.

Figure 6:
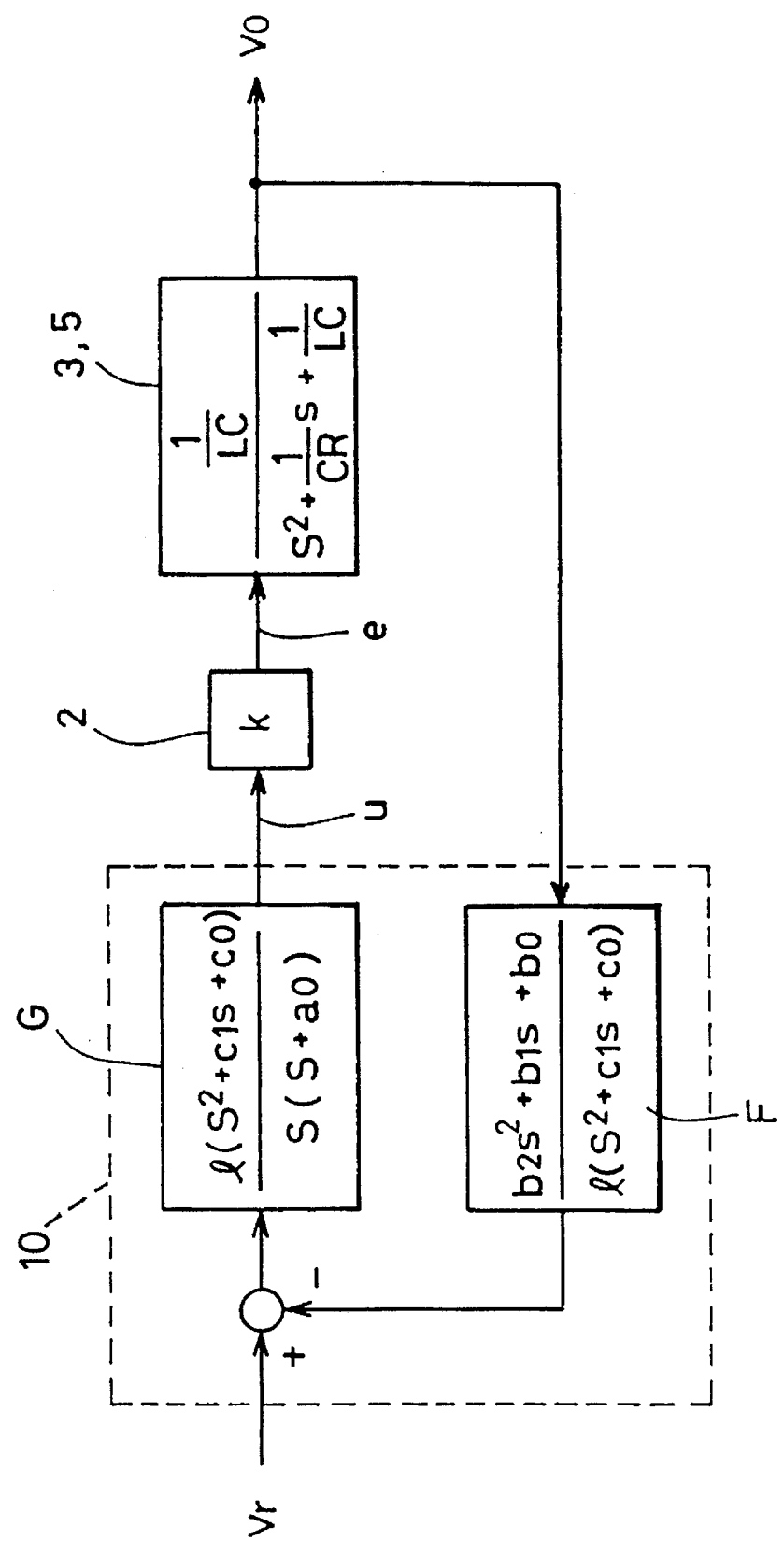
FIG. 6 is a block diagram of still another embodiment of the present invention.

The block diagram shown in FIG. 6 will be described. Referring to FIG. 6, controller 10 provides the output voltage $v_0$ to an operation element F which is represented by the equation (7):

$$\frac{b_2 s^2 + b_1 s + b_0}{l(s^2 + c_1 s + c_0)} \quad (7)$$

The difference obtained by the subtraction of the output of operation element F from the instruction voltage $v_r$ is applied to an operation element G which is represented by the equation (5) above, and the output from operation element G is applied to power converter 2.

Figure 7:
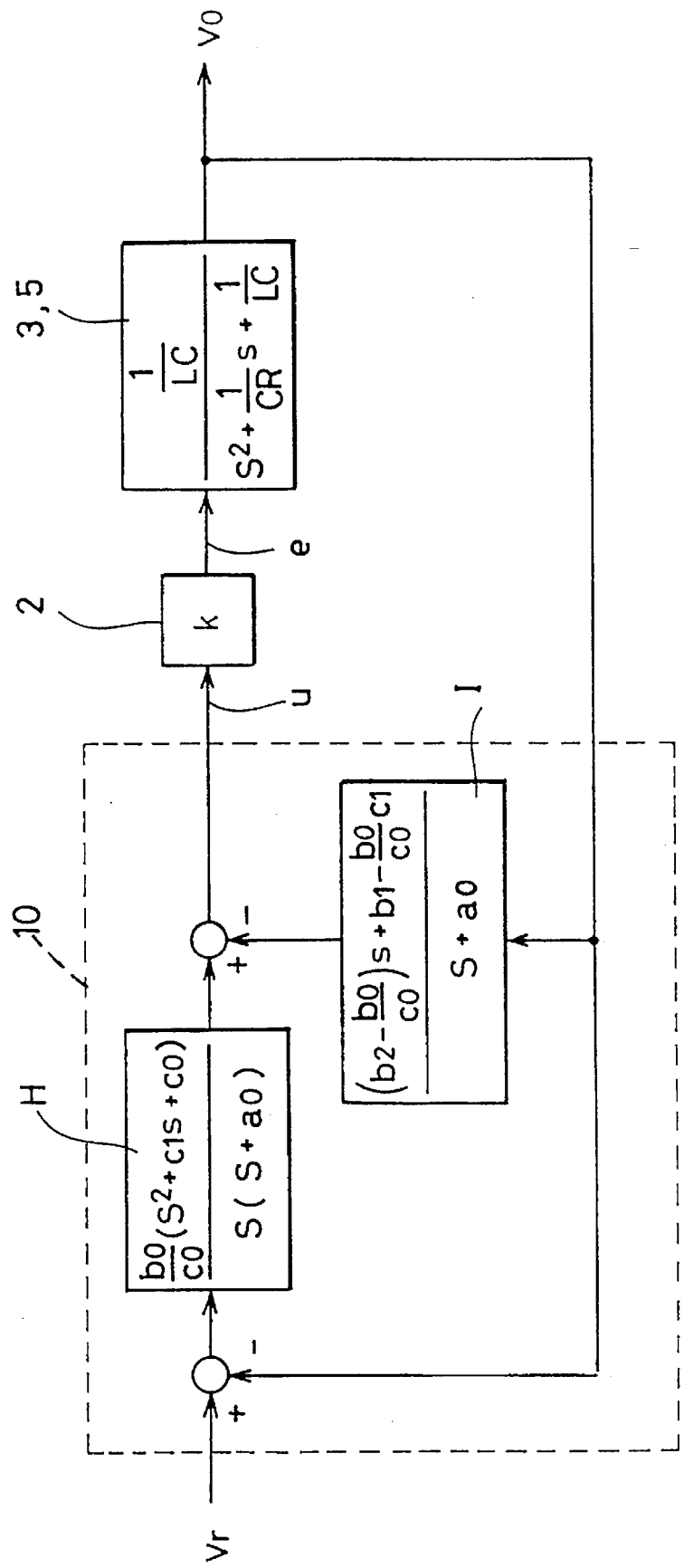
FIG. 7 is a block diagram of still another embodiment of the present invention.

The block diagram of FIG. 7 will be described. Referring to FIG. 7, controller 10 provides the operation element H represented by the following equation (8) with a voltage obtained by subtracting the output voltage $v_0$ from the instruction voltage $v_r$:

$$\frac{\frac{b_0}{c_0}(s^2 + c_1 s + c_0)}{s(s + a_0)} \quad (8)$$

The output voltage $v_0$, is applied to the operation element I defined by the equation (9):

$$\frac{\left(b_2 - \frac{b_0}{c_0}\right) s + b_1 - \frac{b_0}{c_0} c_1}{s + a_0} \quad (9)$$

The difference obtained by subtracting the output of operation element I from the output of operation element H is applied to power converter 2.

Figure 8:
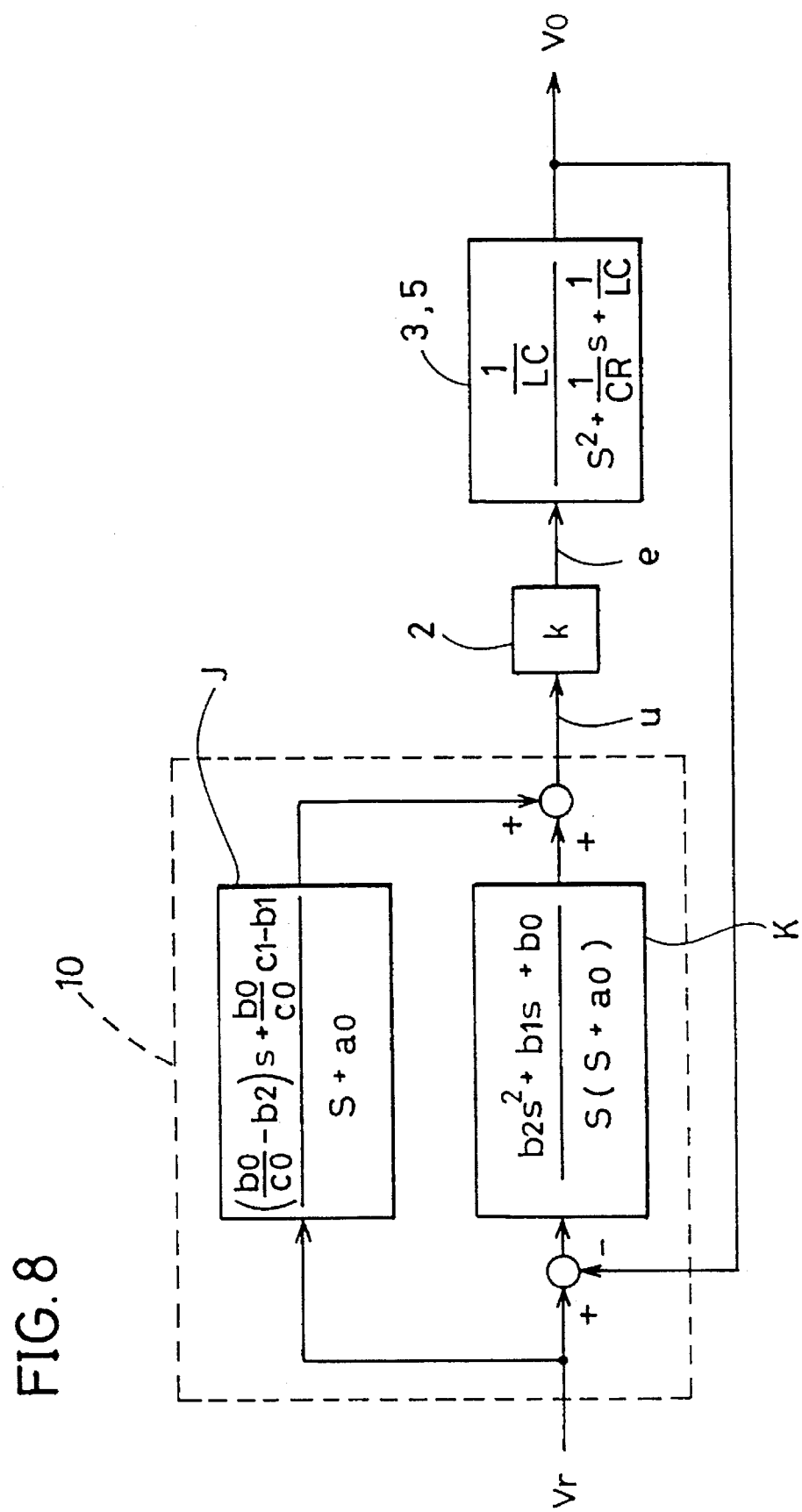
FIG. 8 is a block diagram of still another embodiment of the present invention.

The block diagram of FIG. 8 will be described. Referring to FIG. 8, controller 10 provides operation element J represented by the equation (10) with for instruction voltage $v_r$:

$$\frac{\left(\frac{b_0}{c_0} - b_2\right) s + \frac{b_0}{c_0} c_1 - b_1}{s + a_0} \quad (10)$$

The difference obtained by subtraction of output voltage $v_0$ from instruction voltage $v_r$, is provided to operation element K defined by the equation (6) above, and the sum of the output of operation element J and the output of operation element K is applied to power converter 2.

Figure 9:
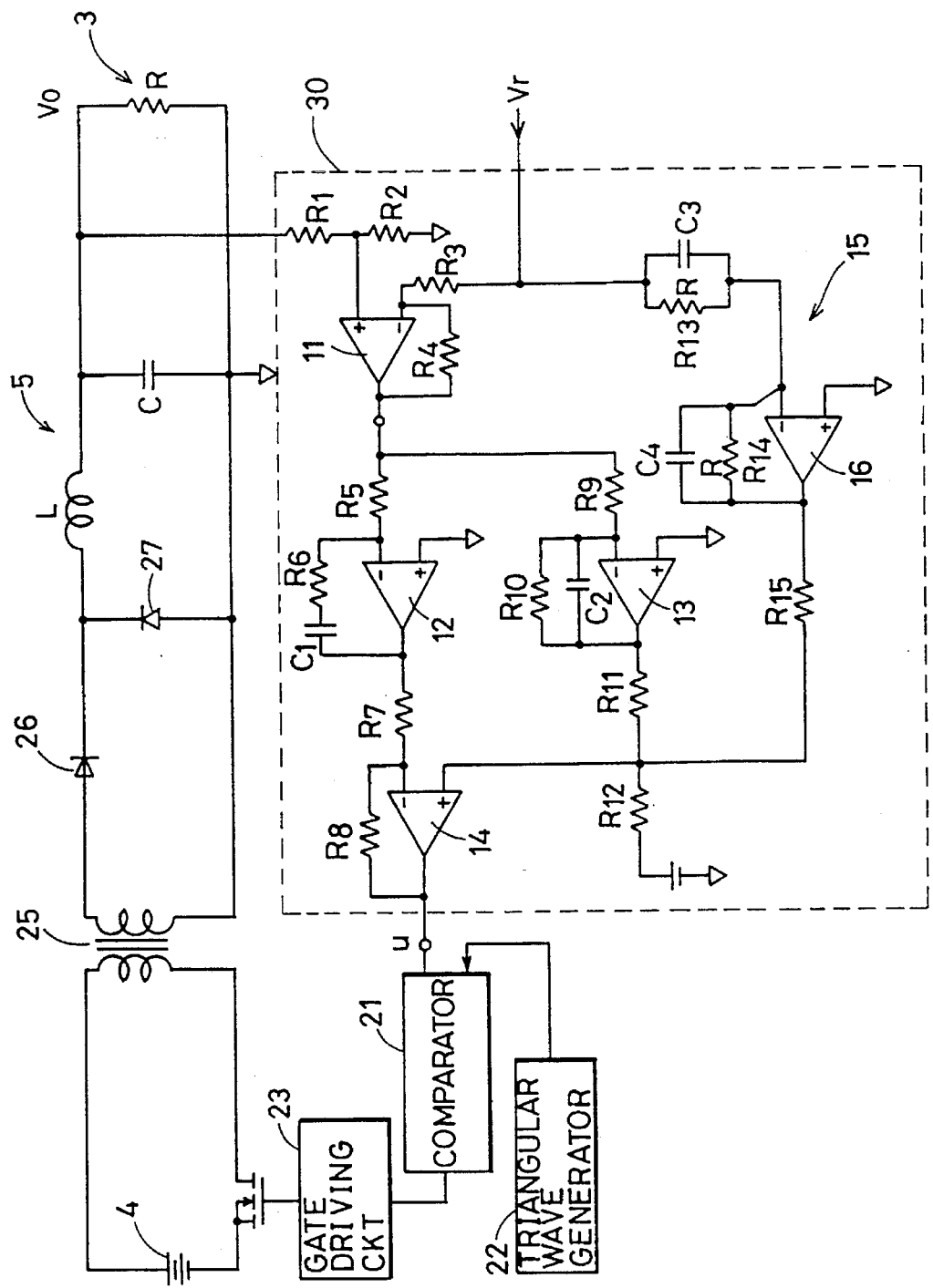
FIG. 9 is an example of circuitry corresponding to the block diagram shown in FIG. 8.

FIG. 9 is an example of circuitry implementing the block diagram of FIG. 8. The example of FIG. 9 is the same as FIG. 1 except the following point. Namely, in addition to the structure of controller 10 shown in FIG. 1, a phase compensating feedback element 15 is additionally connected to a controller 30. More specifically, instruction voltage $v_r$ is applied to one input end of an amplifier 16 through a parallel circuit of resistor R13 and capacitor C3. Between the other input end and an output end of amplifier 16, a parallel circuit of resistor R14 and capacitor C4 is connected. The other input end of amplifier 16 is grounded, and the output end is connected to the other input end of amplifier 14 through resistor R15. The phase compensating feedback element 15 shown in FIG. 9 constitutes the element J of FIG. 8, and other portions of controller 30 provide the element K of FIG. 8.

When it is assumed in FIG. 9 that R1=R2=R3=R4=R7= R8=R11=R12, C2=C4 and R10=R14, the values $a_0$, $b_1$ and $b_2$ can be represented by the following equations.

$$C_0 = \frac{C2}{C3} \left( \frac{1}{C1C2R5R10} - \frac{R6}{R5} \right)$$

$$C_1 = \frac{\left\{ \frac{1}{C2R13} + \left( \frac{R6}{R5} - \frac{R10}{R9} \right) \frac{1}{C2R10} + \frac{1}{C1R5} \right\}}{\left( \frac{R6}{R5} - \frac{R3}{C4} \right)}$$

As described above, in accordance with the embodiment of the present invention, a controller having the function of decreasing gain while making the phase advanced in a certain frequency range can be realized, and therefore it becomes stable against fluctuation of internal parameters and fluctuation of input/output, good response is ensured even when the input/output fluctuates dynamically, and the output voltage can quickly follow the instruction voltage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply, comprising:

a power converter for generating a voltage to be supplied from said power supply to a load; a filter connected between said power converter and said load; and a controller for controlling said power converter; wherein said controller receives an instruction voltage and an output voltage of said filter as inputs, outputs a difference obtained by subtracting the output voltage from said instruction voltage to circuitry which implements an operation element A defined as:

$$\frac{b_2s^2 + b_1s + b_0}{s(s + a_0)},$$

wherein a and b are constants and s is a complex variable, and applies an output from the element A circuitry to said power converter.

2. The power supply according to claim 1, wherein a root of the numerator of the element A, when $b_2s^2+b_1s+b_0$ included in said operation element A is 0, is a complex number.

3. A power supply, comprising:

a power converter for generating a voltage to be supplied from said power supply to a load;

a filter connected between said power converter and said load;

and a controller for controlling said power converter; wherein said controller has first and second inputs, outputs a voltage instruction value as said first input to circuitry which implements an operation element B defined as $$\frac{l(s^2 + c_1s + c_0)}{b_2s^2 + b_1s + b_0},$$

wherein l, b and c are constants and s is a complex variable, and receives an input voltage value as said second input; determines a difference by subtracting said input voltage value from an output from the operation element B circuitry, and provides said difference to circuitry which implements an operation element C defined as $$\frac{b_2s^2 + b_1s + b_0}{s(s + a_0)},$$

wherein l, b and are constants and s is a complex variable, and applies an output from the operation element C to said power converter.

4. The power supply according to claim 3, wherein said operation elements B and C are determined such that $s^2+c_1s+c_0$ represented by $c_1$ and $c_0$ included in said operation element B is canceled in a transfer function when the voltage value of the output is viewed from the input of said voltage instruction value.

5. The power supply according to claim 3, wherein a root of the numerator of the element C, when $b_2s^2+b_1s+b_0$ included in said operation element C is 0, is a complex number.

6. A power supply, comprising:

a power converter for generating an output voltage to be supplied from said power supply to a load;

a filter connected between said power converter and said load; and a controller for controlling said power converter; wherein said controller has first and second inputs, outputs a voltage instruction value as each first input to circuitry which implements an operation element D defined as $$\frac{l(s^2 + c_1s + c_0)}{s(s + a_0)},$$

wherein l, a and c are constants and s is a complex variable, and provides said output voltage to be supplied to said load, as said second input, to circuitry which implements an operation element E defined as $$\frac{b_2s^2 + b_1s + b_0}{s(s + a_0)},$$

wherein a and b are constants and s is a complex variable, and determines a difference by subtracting an output from said operation element E circuitry from an output from said operation element D circuitry and applies said difference to said power converter.

7. The power supply according to claim 6, said operation elements D and E are determined such that $s^2+c_1s+c_0$ represented by $c_1$ and $c_0$ included in said operation element D is canceled in a transfer function when said output voltage is viewed from the input of said voltage instruction value.

8. The power supply according to claim 6, wherein a root of the numerator of the element E when $b_2s^2+b_1s+b_0$ included in said operation element E is 0, is a complex number.

9. A power supply, comprising:

a power converter for generating an output voltage value to be supplied from said power supply to a load; a filter connected between said power converter and said load; and a controller for controlling said power converter; wherein said controller has first and second inputs, outputs said output voltage value as said first input to circuitry which implements an operation element F defined as $$\frac{b_2s^2 + b_1s + b_0}{l(s^2 + c_1s + c_0)},$$

wherein l, b and c are constants and s is a complex variable, receives a voltage instruction value as said second input; determines a difference by subtracting an output from the operation element F from the voltage instruction value and applies said difference to circuitry which implements an operation element G defined as $$\frac{l(s^2 + c_1s + c_0)}{s(s + a_0)},$$

wherein l, a and c are constants and s is a complex variable, and applies an output from the operation element G circuitry to said power converter.

10. The power supply according to claim 9, wherein said operation elements F and G are determined such that $s^2+c_1s+c_0$ represented by $c_1$ and $c_0$ included in said operation elements F and G is canceled in a transfer function when said output voltage value is viewed from the input of said voltage instruction value.

11. The power supply according to claim 9, wherein a root of the numerator of element F when $b_2s^2+b_1s+b_0$ included in said operation element F is 0, is a complex number.

12. A power supply, comprising:

a power converter for generating an output voltage value to be supplied from said power supply to a load; a filter connected between said power converter and said load; and a controller for controlling said power converter; wherein said controller has first and second inputs, outputs a difference obtained by subtracting said output voltage value as a second input from an instruction voltage value as said first input to circuitry which implements an operation element H defined as $$\frac{\frac{b_0}{c_0}(s^2 + c_1 s + c_0)}{s(s + a_0)},$$

wherein a, b and c are constants and s is a complex variable, also outputs the output voltage value to circuitry which implements an operation element I represented $$\frac{\left(b_2 - \frac{b_0}{c_0}\right)s + b_1 - \frac{b_0}{c_0}c_1}{s + a_0},$$

wherein a, b and c are constants and s is a complex variable, and applies a difference obtained by subtracting an output from said operation element I from an output of said operation element H to said power converter.

13. The power supply according to claim 12, wherein said operation elements H and I are defined such that $s^2+c_1s+c_0$ represented by $c_1$ and $c_0$ included in said operation elements H and I is canceled in a transfer function when the output voltage value is viewed from the input of said voltage instruction value.

14. A power converter, comprising:

a power converter for generating an output voltage value to the supplied to a load from said power supply; a filter connected between said power converter and said load; and a controller for controlling said power converter; wherein said controller has first and second inputs, and outputs a voltage instruction value as said first input to circuitry which implements an operation element J defined as $$\frac{\left(\frac{b_0}{c_0} - b_2\right)s + \frac{b_0}{c_0}c_1 - b_1}{s + a_0},$$

wherein a, b and c are constants and s is a complex variable, obtains a difference by subtracting said output voltage value applied as said second input from said voltage instruction value and supplies said difference to circuitry which implements an operation element K defined as $$\frac{b_2 s^2 + b_1 s + b_0}{s(s + a_0)},$$

wherein a and b are constants and s is a complex variable, and applies a sum of an output from said operation element J circuitry and an output from said operation element K circuitry to said power converter.

15. A power supply according to claim 4, wherein said operation elements J and K are determined such that $s^2+c_1s+c_0$ represented by $c_1$ and $c_0$ included in said operation element J is canceled in a transfer function when said output voltage value is viewed from the input of said voltage instruction value.

16. The power supply according to claim 14, wherein a root of the numerator of element K when $b_2s^2b_1s+b_0$ included in said operation element K is 0, is a complex number.

* * * * *